May 17, 1938. E. MAY 2,117,737
ILLUMINATING MEANS FOR PROJECTION APPARATUS
Filed June 2, 1936
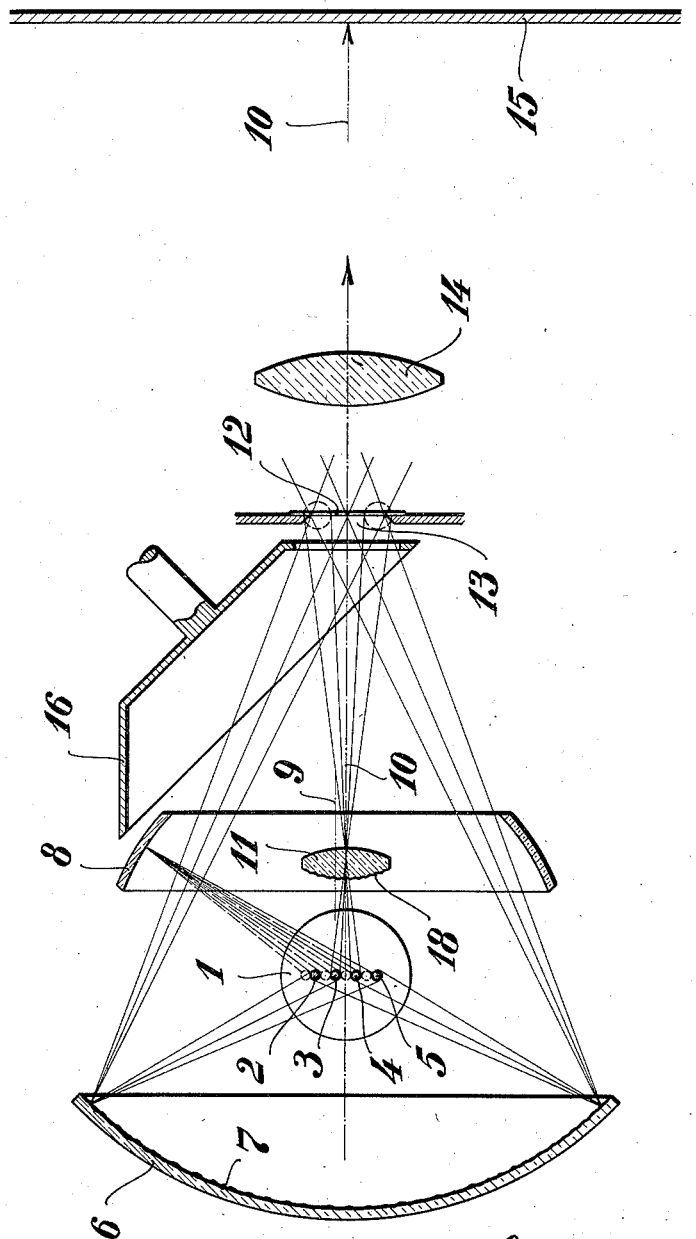

Patented May 17, 1938

2,117,737

UNITED STATES PATENT OFFICE 2,117,737

ILLUMINATING MEANS FOR PROJECTION APPARATUS

Erwin May, Wetzlar, Germany, assignor to Ernst Leitz, G. m. b. H., Wetzlar, Germany Application June 2, 1936, Serial No. 83,007
In Germany July 15, 1935

3 Claims. (Cl. 88—24)

The object of this invention is to provide certain improvements in the illuminating means for projection apparatus embodying an arrangement including the use of electric filament lamps whereby the image of the filaments is formed in the plane of the picture instead of in the objective as is the case in prior disclosures. In the art it is known that the image of the source of light in projection apparatus may be formed in the plane of the picture if arc lamps are used. But where filament lamps are used it has hitherto not been possible or practical to form the image of the filaments in the plane of the picture because the filaments do not form an evenly lighted surface or area. Hence, in prior disclosures, the image of the filament is formed in the objective although such an arrangement does not provide the best possible illumination for projection purposes, it being known, that maximum illumination is obtained only if the image of the light is formed in the plane of the picture to be projected.

The object of the invention is to provide an apparatus for utilizing the full illuminating power of the light source from an electric filament lamp by forming the image thereof in the plane of the picture. Accordingly the invention is embodied in an arrangement or construction including an electric filament lamp the light of which is reflected by a hollow mirror having a slightly grained surface providing diffused or blurred reflection of the filament. In addition, the invention includes the use of a ring formed mirror for producing a laterally displaced reflected image of the filament in its own plane whereby a diffused or spreading light is obtained in the light source itself. A further object of the invention is to provide a condensing lens in front of the filament so arranged that the light rays of two adjacent filaments are specifically directed toward the edges of the field of the picture to compensate for a weakening or lessening of the light strength at the edges of the picture and whereby even uniform light is provided.

The invention is illustrated diagrammatically in the accompanying drawing in which an electric lamp 1 is provided with a number of filaments. In the present instance and by way of an example there are four separate threads in the filament marked 2, 3, 4 and 5. 6 is a hollow reflecting mirror having a slightly grained reflecting surface 7. 8 is a ring formed mirror the axis 9 of which is slightly offset from the optical axis 10 of the system. 11 is a condensing lens placed between the lamp 1 and the picture, slide or film 12 which is placed or exposed through a film window 13 as will be understood. 14 is the projecting objective and 15 the screen. 16 indicates a rotating shutter if such is used.

Rays from the lamp filaments striking the ring formed mirror 8 will be reflected back and form offset images of the filament threads in the plane of the filament as indicated by small dotted circles, the reflected images of the filament threads being interposed between the filament threads themselves to provide an enlarged light source in the plane of the filament. The rays from the light source or lighted area thus formed are in turn reflected by the hollow mirror 6 in the plane of the film or picture 12. Because of the fact that the hollow mirror 6 has a more or less finely grained, not smooth, reflecting surface 7, the images of the filaments and of the displaced reflected images of the filaments are reflected in the plane of the film or picture 12 in a manner to completely blend and diffuse the separate elements of the source of light so that an even uniform illumination of the picture and film is obtained and the individual images of the several illuminating elements disappear.

If desired, a condensing lens 11 may be interposed between the lamp and the film, the lens having such a focal length and being so proportioned and placed that it forms an image by refraction of the two adjacent filament threads such as 3 and 4 into the plane of the film in such a manner that the reflected images thereof lie at the edges of the film 12 and thus illuminate the side portions of the film to compensate for the usual decrease or diminution in the illumination of the side portions which otherwise takes place or occurs. The condensing lens may have a grained surface as at 18 whereby to cause a blurred reflection of the two filament threads to prevent them from being noticed in the picture. However, even without such grained surface of the condenser, the image of the two separately reflected filaments practically disappears in the reflected light from the hollow mirror.

With an arrangement or system as herein disclosed a reflected offset image of the filament of the lamp is formed in the plane of the film and the entire area of the field of view of the picture is uniformly illuminated under utilization of the full illuminating strength of the source of light. It is understood of course that the term film is used to indicate a picture or illustration to be projected.

I claim:—

1. An apparatus for illuminating a film or picture to be projected upon a screen comprising an incandescent lamp having a plurality of separated parallel filament threads in a single plane, a spherical reflector to one side of the lamp between the latter and the screen having its focus so related with respect to the plane of the filament and offset with respect to the optical axis of the apparatus that it forms offset images of the filament threads between the latter in the plane of the filament, a concave mirror on the opposite side of the lamp having a finely waved irregular reflecting surface for reflecting the illumination emanating from the filament and from the reflected offset images of the filament threads upon the film, the focus of the said reflecting mirror being so related with respect to the film that a diffused blended image of the filament and of the reflected images of the filament threads is formed in the plane of the film.

2. An apparatus for illuminating a film or picture to be projected upon a screen comprising an incandescent lamp having a plurality of separated parallel filament threads in a single plane, a spherical reflector to one side of the lamp between the latter and the screen having its focus so related with respect to the plane of the filament and offset with respect to the optical axis of the apparatus that it forms offset images of the filament threads between the latter in the plane of the filament, a concave mirror on the opposite side of the lamp having a finely waved irregular reflecting surface for reflecting the illumination emanating from the filament and from the reflected offset images of the filament threads upon the film, the focus of the said reflecting mirror being so related with respect to the film that a diffused blended image of the filament and of the reflected images of the filament threads is formed in the plane of the film, a condensing lens between the lamp and the film a predetermined distance from the lamp whereby to cause the images of two adjacent filament threads in said lamp to be formed in the plane of the film at the side portions thereof, one filament thread image at each side.

3. An apparatus according to claim 2 in which the condensing lens has at least one finely waved irregular lens surface.

ERWIN MAY.